United States Patent [19]

Eylon

[11] Patent Number: 5,226,982
[45] Date of Patent: Jul. 13, 1993

[54] METHOD TO PRODUCE HOLLOW TITANIUM ALLOY ARTICLES

[75] Inventor: Daniel Eylon, Dayton, Ohio

[73] Assignee: The United States of America as represented by the Secretary of the Air Force, Washington, D.C.

[21] Appl. No.: 883,734

[22] Filed: May 15, 1992

[51] Int. Cl.5 .................... C22C 14/00; B23K 19/00
[52] U.S. Cl. .................. 148/522; 148/669; 228/263.21; 427/105
[58] Field of Search .............. 148/522, 669; 228/263.21; 427/105

[56] References Cited

U.S. PATENT DOCUMENTS

| | | | |
|---|---|---|---|
| 3,936,920 | 2/1976 | Conn | 29/156.8 B |
| 4,043,498 | 8/1977 | Conn | 228/265 |
| 4,482,398 | 11/1984 | Eylon et al. | 148/11.5 F |
| 4,612,066 | 9/1986 | Levin et al. | 148/20.3 |
| 4,632,296 | 12/1986 | Mansbridge et al. | 420/902 |
| 4,726,852 | 2/1988 | Nakanose et al. | 148/671 |
| 4,820,360 | 4/1989 | Eylon et al. | 148/133 |
| 4,982,893 | 1/1991 | Ruckle et al. | 228/263.21 |
| 5,055,143 | 10/1991 | Runyan et al. | 420/902 |
| 5,063,662 | 11/1991 | Porter et al. | 148/671 |

Primary Examiner—Upendra Roy
Attorney, Agent, or Firm—Charles E. Bricker; Thomas L. Kundert

[57] ABSTRACT

A method for producing hollow titanium alloy articles which comprises casting a plurality of segments which can be joined to provide a unitary, hollow article, treating the cast segments in such manner as to refine the microstructure of the segments and superplastic forming/diffusion bonding the segments into the desired hollow article.

12 Claims, 1 Drawing Sheet

METHOD TO PRODUCE HOLLOW TITANIUM ALLOY ARTICLES

RIGHTS OF THE GOVERNMENT

The invention described herein may be manufactured and used by or for the Government of the United States for all governmental purposes without the payment of any royalty.

BACKGROUND OF THE INVENTION

This invention relates to the production of hollow titanium alloy articles, particularly alpha+beta and near alpha titanium alloy articles.

Recent developments in the design of high bypass gas turbine engines have increased the need for the production of lighter, yet stiffer rotating components, such as fan blades and compressor blades. Hollow titanium alloy parts are the prime choice due to their high strength-to-weight ratio and high fatigue resistance. However, the manufacture of hollow titanium alloy components presents several problems.

The most common method for fabricating aerodynamic blades and vanes is by forging solid blanks, followed by machining to achieve the desired shape and contours. While net precision forgings may be produced, these require the use of special alloys known in the art, but the latter are not as efficient as the wrought alloys. In the case of larger vanes, builtup brazed assemblies are typically produced. Each of these present methods is relatively costly and produces structures which are heavier than desirable.

Conn, U.S. Pat. No. 3,936,920, describes the fabrication of an aerodynamic blade or vane comprising an internally stiffened shell structured panel and a root fitting. Fabrication of this blade comprises fabrication of a panel blank composed of top and bottom face sheets diffusion bonded to a honeycomb core. The panel blank is rough trimmed to size, then shaped, by crushing, to an initial aerodynamic shape. The shaped panel blank is tack welded to the root fitting to assure that the parts will maintain their spatial relationship during the die loading step. The panel/root assembly is then vacuum die pressed to diffusion bond the leading and trailing edges and to mechanically interlock the panel to the root fitting. Following the forming and bonding step, the blade requires removal of surplus flashing and, possibly, machining. Conn, U.S. Pat. No. 4,043,498, describes fabrication of a shaped panel blank. Both of these methods require a plurality of component parts and considerable handling of the various components. Both methods are replete with opportunity for contamination of the component parts, which is very adverse to diffusion bonding.

Hollow components can be produced by superplastic forming/diffusion bonding (SPF/DB) of two or more segments in such manner that will produce a hollow internal cavity with optional internal webbing or reinforcement. One way to produce such segments is by investment casting. However, SPF/DB of cast titanium alloy structures is not generally possible due to the coarse microstructure of the as-cast segments. The as-cast microstructure of alpha+beta titanium alloys consists of coarse transformed beta structure. It typically exhibits large beta grains separated by grain boundary alpha phase and colonies of similarly aligned and crystallographically-oriented alpha plates within the beta grains. SPF/DB requires fine two-phase microstructure.

Accordingly, it is an object of this invention to provide a method for producing hollow alpha+beta and near-alpha titanium alloy articles.

Other objects and advantages of the invention will be apparent to those skilled in the art.

SUMMARY OF THE INVENTION

In accordance with the present invention there is provided a method for producing hollow titanium alloy articles which comprises casting a plurality of segments which can be joined to provide a unitary, hollow article, treating the cast segments in such manner as to refine the microstructure of the segments and superplastic forming/diffusion bonding the segments into the desired hollow article.

DETAILED DESCRIPTION OF THE INVENTION

The alloy to be used in the practice of this invention can be an alpha+beta or near-alpha titanium alloy. Typical alloys include the following: Ti-6Al-4V, Ti-6Al-6V-2Sn, Ti-8Mn, Ti-7Al-4Mo, Ti-4.5Al-5Mo-1.5Cr, Ti-6Al-2Sn-4Zr-6Mo, Ti-5Al-2Sn-2Zr-4Mo-4Cr, Ti-6Al-2Sn-4Zr-2Mo-2Cr, Ti-3Al-2.5V, Ti-5Al-2.5Sn, Ti-8Al-1Mo-1V, Ti-6Al-2Sn-4Zr-2Mo-0.1Si, Ti-6Al-2Nb-1Ta-0.8Mo, and Ti-2.25Al-11Sn-5Zr-1Mo. The alloy may further contain up to about 6 weight percent of a dispersoid such as boron, thorium or a rare earth element.

Figure 1:
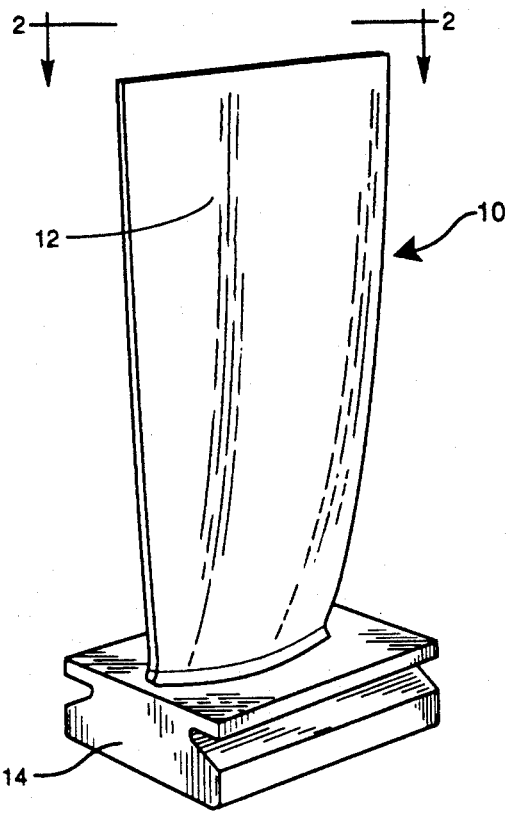
FIG. 1 illustrates a hollow turbine blade.
Figure 2:
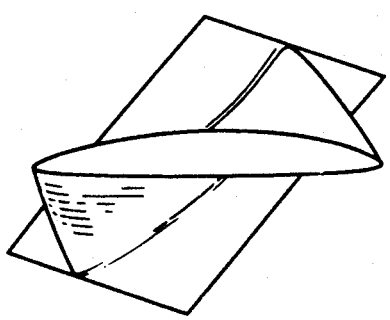
FIG. 2 is a plan view along line 2—2 of FIG. 1.

Referring to the drawing, FIG. 1 illustrates a hollow turbine blade 10 including an airfoil portion 12 and a root portion 14. The complex nature of the airfoil portion 12 is best seen from the plan view in FIG. 2.

Figure 3:
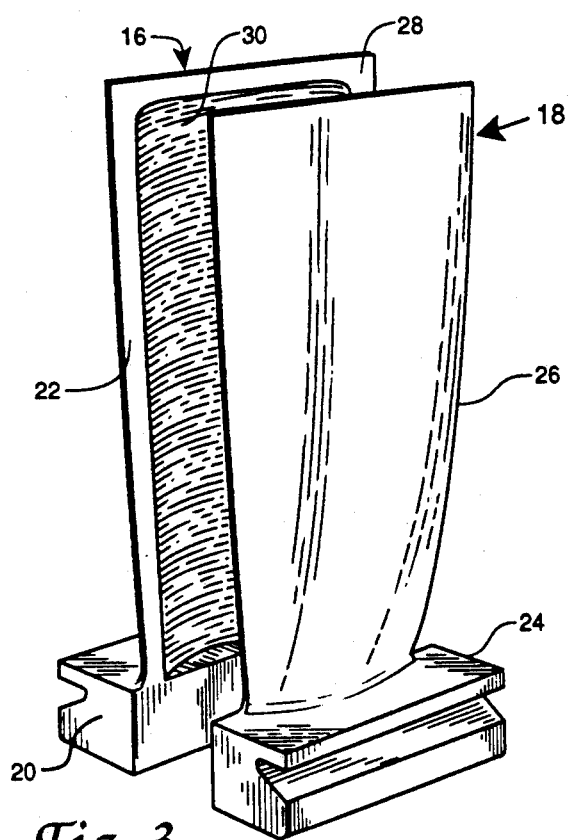
FIG. 3 illustrates the cast segments of the blade of FIG. 1.

Blade 10 is fabricated from two segments 16 and 18, as shown in FIG. 3. Segment 16 consists of a root portion 20 and an airfoil portion 22. Segment 18 consists of a root portion 24 and an airfoil portion 26. When segments 16 and 18 are joined together, root portion 14 comprises items 20 and 24 and airfoil portion 12 comprises items 22 and 26.

Airfoil portion 22 of segment 16 comprises mating surfaces 28 and a concave region 30. Airfoil portion 26 of segment 18 has complementary mating surfaces, not shown, and may have a concave, convex or flat region.

Segments 16 and 18 can be cast using any casting technique known in the art. For complex shapes, such as turbine blades, investment casting is the presently preferred technique.

Investment casting is adaptable to automation and production of large-quantity runs. Investment casting is capable of producing true net shapes, with accurate dimensions and very good surface finish, that require almost no further machining or surface finishing. In this method, a wax pattern is produced by injection molding. The pattern assembly is dipped in a ceramic slurry, stuccoed and dried. This is repeated several times to build a ceramic shell with sufficient strength to sustain the molding pressure. After drying, the wax pattern is removed and the ceramic shell is fired. The ceramic shell is then filled with the titanium molding material, using a suitable apparatus. After casting, the ceramic shell is removed.

Following recovery of the casting from the mold, the casting may, optionally, be densified by Hot Isostatic Pressing (HIP). Titanium alloys dissolve their own oxides at high temperatures allowing a complete closure of all non-surface-connected porosity by diffusion bonding. The Hot Isostatic Pressing of titanium alloys may be carried out at about 50° above to 200° C. below the beta-transus temperature of the alloy at pressures of 10–45 Ksi for 2–4 hours. The term "beta-transus" refers to the temperature at the line on the phase diagram for the alloy separating the $\beta$-phase field from the $\alpha+\beta$ region where the $\alpha$ and $\beta$ phases coexist. Hot Isostatic Pressing can enhance critical mechanical properties such as fatigue resistance, while causing no serious degradation in properties such as fracture toughness, fatigue crack growth rate or tensile strength.

The microstructure of the cast segments is then refined by one of three methods: BUS, as set forth in U.S. Pat. No. 4,482,398; TCP, as set forth in U.S. Pat. No. 4,612,066; or HTH, as set forth in U.S. Pat. No. 4,820,360, all of which are incorporated herein by reference.

Briefly, the BUS method comprises beta-solution treatment of a casting with rapid cooling to room temperature, preferably by quenching, followed by a relatively high temperature, relatively long aging heat treatment. The beta-solution treatment is accomplished by heating the casting to approximately the beta-transus temperature of the alloy, i.e., about 3% below to about 10% above the beta-transus temperature (in °C.), followed by rapid cooling. The casting is then aged by heating to about 10 to 20 percent below the beta-transus (in °C.) for about 4 to 36 hours, followed by air cooling to room temperature.

The TCP method comprises beta-solution treatment of a casting with rapid cooling to room temperature, preferably by quenching, followed by hydrogenation/dehydrogenation of the article. Titanium and its alloys have an affinity for hydrogen, being able to dissolve up to about 3 weight percent (60 atomic percent) hydrogen at 590° C. While it may be possible to hydrogenate the article to the maximum quantity, it is presently preferred to hydrogenate the article to a level of about 0.1 to 2.3 weight percent of hydrogen.

Hydrogenation is conducted in a suitable, closed apparatus at an elevated temperature by admitting sufficient hydrogen to attain the desired concentration of hydrogen in the alloy. The hydrogenation step is conducted at a temperature of about 50% to 96% of the beta-transus temperature of the alloy. Heating of the article to the desired temperature is conducted under an inert atmosphere. When the hydrogenation temperature is reached, hydrogen is added to the atmosphere within the apparatus. The partial pressure of hydrogen added to the atmosphere and the time required for hydrogenation are dependent upon such factors as the size and cross-section of the article, the temperature of hydrogenation and the desired concentration of hydrogen in the article.

After hydrogenation, the admission of hydrogen to the apparatus is discontinued, and the apparatus is flushed with a non-flammable mixture of inert gas and about 4% hydrogen. The article is allowed to equilibrate at the hydrogenation temperature for about 10 to 20 minutes, and then furnace cooled.

Dehydrogenation is accomplished by heating the article, under vacuum, to a temperature of about 50% to 96% of the beta-transus temperature of the alloy. The time for hydrogen removal will depend on the size and cross-section of the article and the volume of hydrogen to be removed. The time for dehydrogenation must be sufficient to reduce the hydrogen content in the article to less than the maximum allowable level. For the alloy Ti-6Al-4V, the final hydrogen level must be below 120 ppm (0.012 weight percent) to avoid degradation of physical properties such as room temperature ductility.

The HTH method comprises hydrogenation of the article, cooling the hydrogenation article at a controlled rate to room temperature, dehydrogenating the article and cooling the dehydrogenated article at a controlled rate to room temperature. Conditions for hydrogenation/dehydrogenation are similar to the conditions set forth previously. The rate of cooling is about 5° to 40° C. per minute.

Figure 4:
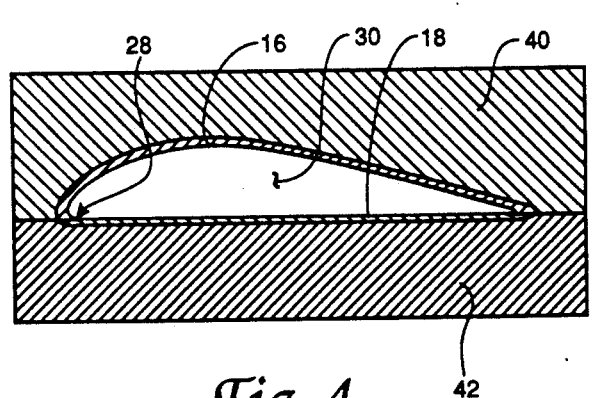
FIG. 4 illustrates bonding of the segments.
Figure 5:
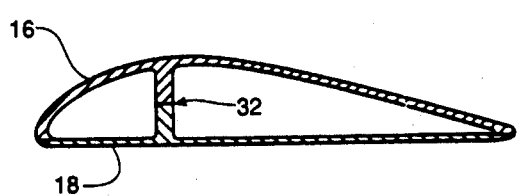
FIG. 5 illustrates an internally stiffened hollow blade.

Following refinement of the microstructure, the cast segments are bonded together. The bonding operation is illustrated in cross-section in FIG. 4. Rigid dies 40 and 42 have the contour of the airfoil portion 12 of the final part. The segments 16 and 18 are placed within the dies which are then closed with the application of temperature, time and pressure sufficient to bond the mating surfaces 28. Typical SPF/DB conditions include a temperature about 10° to 100° C. below the beta-transus temperature of the alloy, a pressure of about 10 to 100 MPa (1.5 to 15 Ksi) and time about 15 minutes to 24 hours. It is also within the scope of the invention to produce a hollow article having internal stiffening 32, as shown in cross-section in FIG. 5.

Although the invention has been described and illustrated in terms of an aerodynamic blade or vane, it will be apparent to those skilled in the art that the method of this invention is applicable to the fabrication of any hollow titanium alloy article. The advantages of this invention include precision casting of the article segments, minimal handling of the segments and opportunity for inspection of the internal surfaces of the hollow segments.

Various modifications may be made to the invention as described without departing from the spirit of the invention or the scope of the appended claims.

I claim:

1. A method for producing hollow titanium alloy articles which comprises casting a plurality of segments which, when joined, provide a unitary article having a hollow internal cavity, heating said cast segments to approximately the beta-transus temperature of the alloy, rapidly cooling the heated segments to room temperature, heating the rapidly cooled segments to about 10 to 20% below said beta-transus temperature, in degrees Centigrade, for about 4 to 36 hours, and air cooling the segments to room temperature, and superplastic forming/diffusion bonding the segments into the desired hollow article.

2. The method of claim 1 wherein said segments are cast from an alpha+beta or near-alpha titanium alloy.

3. The method of claim 1 further comprising hot isostatic pressing said cast segments.

4. A method for producing hollow titanium alloy articles which comprises casting a plurality of segments which, when joined, provide a unitary article having a hollow internal cavity, heating said cast segments to approximately the beta-transus temperature of the alloy, rapidly cooling the heated segments to room temperature, hydrogenating the segments at a temperature about 50 to 96% of said beta-transus temperature, and dehydrogenating the segments at a temperature about 50 to 96% of said beta-transus temperature, and superplastic forming/diffusion bonding the segments into the desired hollow article.

5. The method of claim 4 wherein said segments are hydrogenated to about 0.1 to 2.3 weight percent hydrogen.

6. The method of claim 5 wherein said segments are cast from an alpha+beta or near-alpha titanium alloy.

7. The method of claim 4 further comprising hot isostatic pressing said cast segments.

8. A method for producing hollow titanium alloy articles which comprises casting a plurality of segments which, when joined, provide a unitary article having a hollow internal cavity, hydrogenating the segments at a temperature about 50 to 96% of said beta-transus temperature, cooling the hydrogenated segments, dehydrogenating the segments at a temperature about 50 to 96% of said beta-transus temperature and cooling the dehydrogenated segments, and superplastic forming/diffusion bonding the segments into the desired hollow article.

9. The method of claim 8 wherein said segments are hydrogenated to about 0.1 to 2.3 weight percent hydrogen.

10. The method of claim 8 wherein said segments are cooled at a controlled rate of about 5° to 40° C. per minute.

11. The method of claim 8 wherein said segments are cast from an alpha+beta or near-alpha titanium alloy.

12. The method of claim 8 further comprising hot isostatic pressing said cast segments.

* * * * *